W. H. MUZZY.
CASH REGISTER.
APPLICATION FILED AUG. 6, 1908.

1,048,861.

Patented Dec. 31, 1912.
5 SHEETS—SHEET 1.

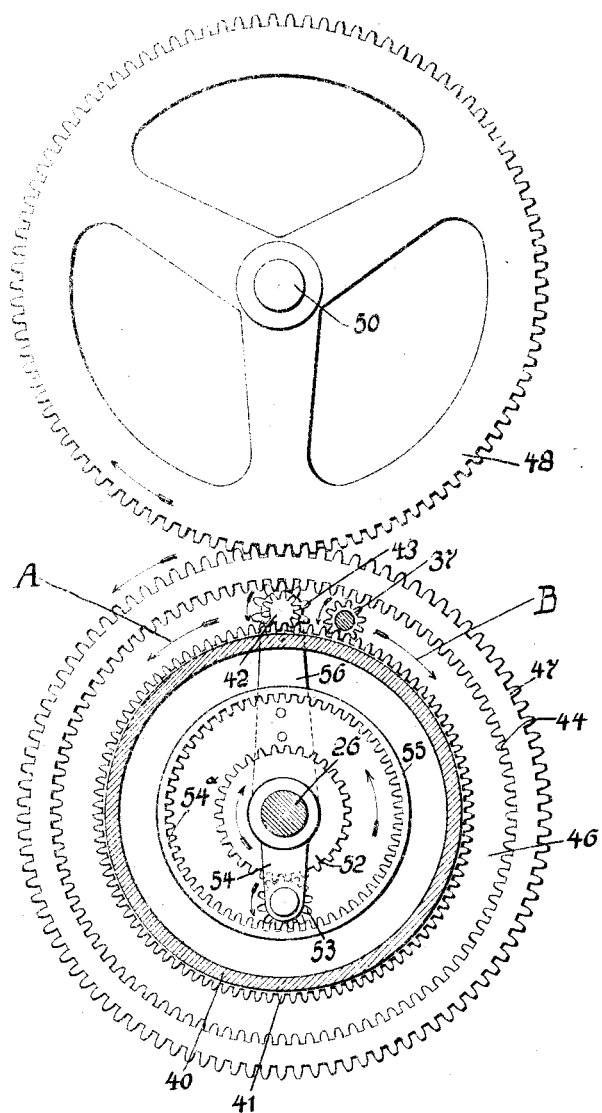

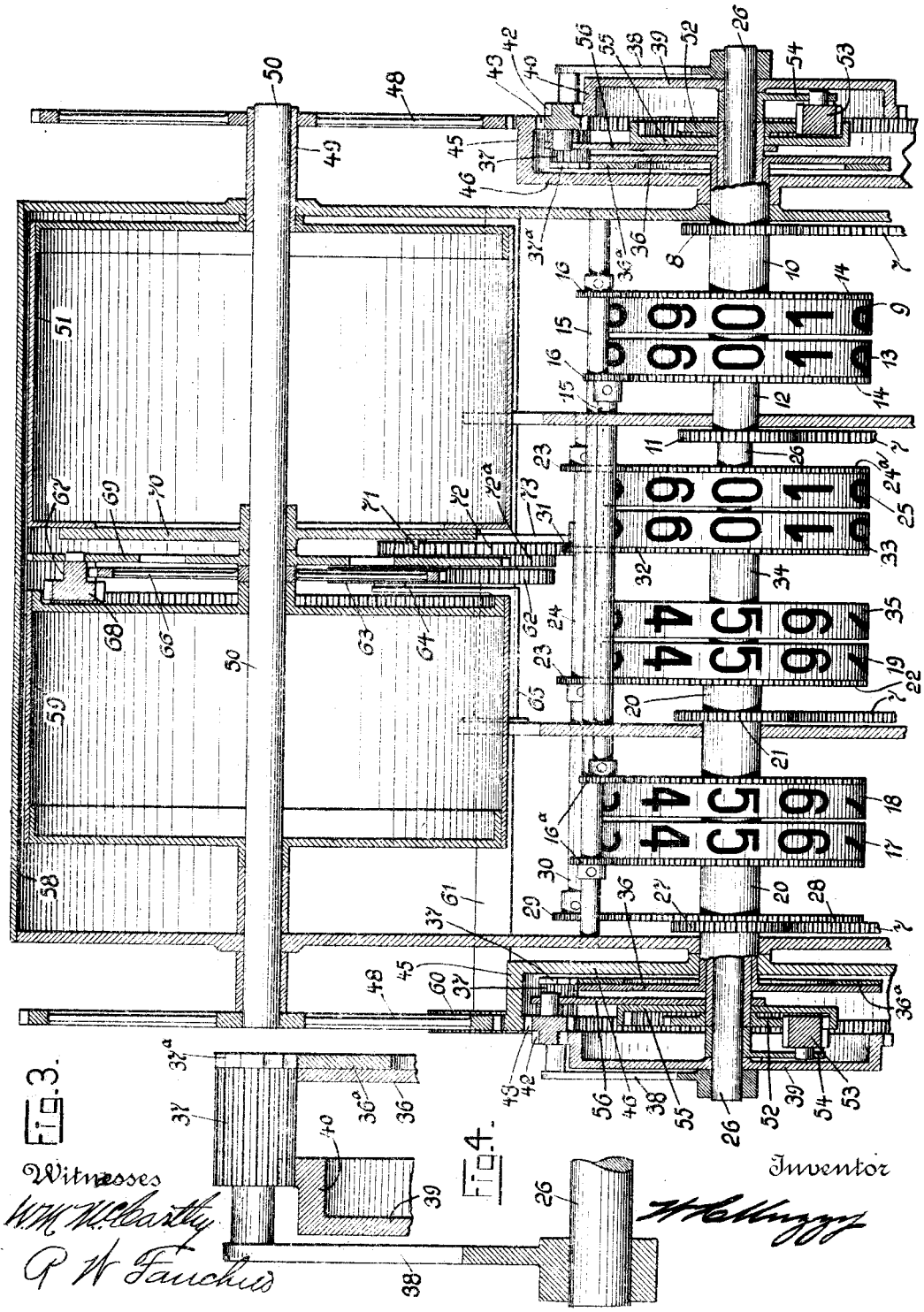

W. H. MUZZY.
CASH REGISTER.
APPLICATION FILED AUG. 6, 1903.

1,048,861.

Patented Dec. 31, 1912.
5 SHEETS—SHEET 4.

W. H. MUZZY.
CASH REGISTER.
APPLICATION FILED AUG. 6, 1908.
1,048,861.
Patented Dec. 31, 1912.
5 SHEETS—SHEET 5.
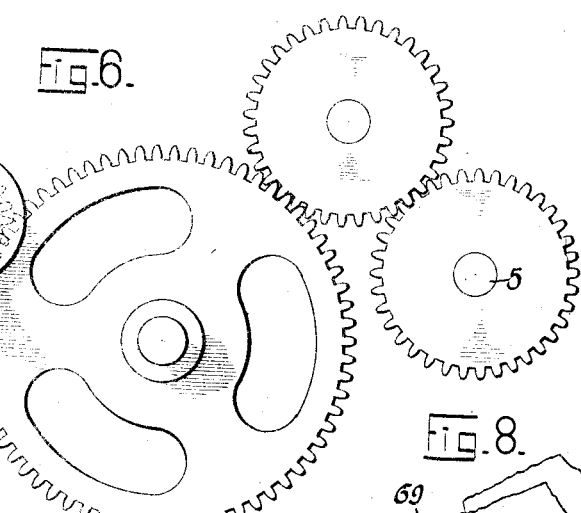
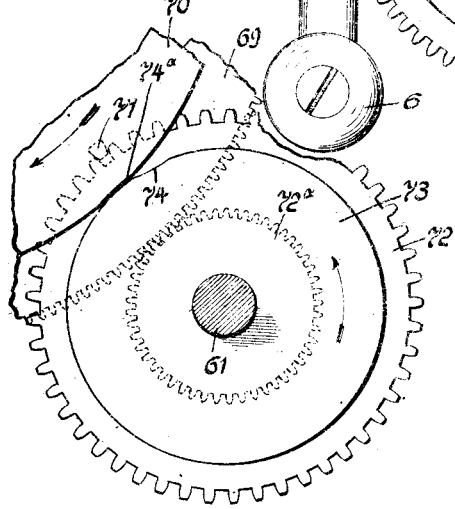
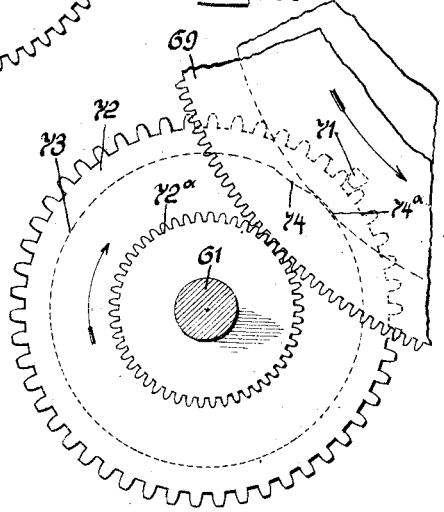
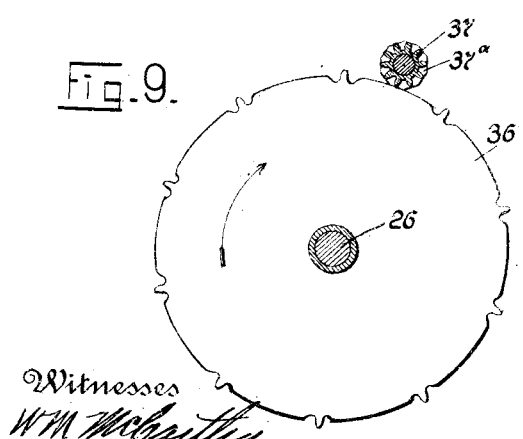
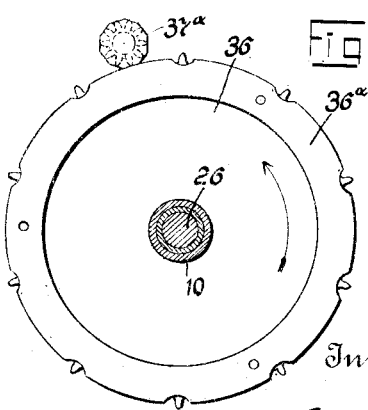
Witnesses
WM McCarthy
R. W. Fairchild
Inventor
W. H. Muzzy

UNITED STATES PATENT OFFICE.

WILLIAM H. MUZZY, OF NEW YORK, N. Y., ASSIGNOR TO THE NATIONAL CASH REGISTER COMPANY, OF DAYTON, OHIO, A CORPORATION OF OHIO, (INCORPORATED IN 1906.)

CASH-REGISTER.

1,048,861.

Specification of Letters Patent.

Patented Dec. 31, 1912.

Application filed August 6, 1908. Serial No. 447,267.

*To all whom it may concern:*

Be it known that I, WILLIAM H. MUZZY, a citizen of the United States, residing at New York, in the county of New York and State of New York, have invented certain new and useful Improvements in Cash-Registers, of which I declare the following to be a full, clear, and exact description.

This invention relates to improvements in cash registers, and has more particular relation to improvements in mechanisms for automatically indicating the amount of change due the customer on different transactions.

The principal object of this invention is to provide a mechanism controlled by the operating devices which will indicate the amounts of change due according to the amounts received.

With this and incidental objects in view, the invention consists in certain novel features of construction and combination of parts, the essential elements of which are set forth in the appended claims and a preferred form of embodiment of which is hereinafter specifically described with reference to the drawings which accompany and form part of this specification.

Of said drawings: Figure 1 represents a central transverse section through the improved machine; Fig. 2 represents an enlarged end elevation partly in section of the gearing for the cent change indicator; Fig. 3 represents a front elevation of the sale indicators with the change indicators and gearing for same in section; Fig. 4 represents an enlarged detail view, partly in section, of the connections for driving the cent change indicator from the cent sale indicator; Fig. 5 represents an enlarged front elevation of the change indicator and its casing, the latter being partly broken away; Fig. 6 represents a detail side elevation of the operating gearing for the machine; Fig. 7 represents a detail end elevation of the transfer locking disk and some of its coöperating parts for the change indicators; Fig. 8 represents a view similar to Fig. 5, but looking in the opposite direction; Fig. 9 represents a detail end elevation of a ten tooth driving disk connected to the cent sale indicator and its coöperating parts; and Fig. 10 represents a view similar to Fig. 9, but looking in the opposite direction.

Described in general terms, the machine comprises a plurality of keys arranged in banks and which determine the extent of movement imparted to the sale indicators by the operating mechanism. Geared to the sale indicators representing the penny banks is a change drum provided with a plurality of rows of numerals. This drum is arranged to be rotated in reversed order a number of spaces corresponding to the cents displayed upon the sale indicators so as to bring beneath a reading opening or slot formed in the casing surrounding said drum, the complements which go to make up the various amounts that might be tendered in payment of the amount purchased. Characters representing such amounts are stamped upon the casing above said opening. The dollar drum is also provided with rows of numerals and is actuated in a similar manner by the dollar sale indicators and in addition is moved an extra space upon the movement of the cent drum, so as to correctly indicate the amount of change due.

Detailed description of the parts is as follows:

Figure 1:
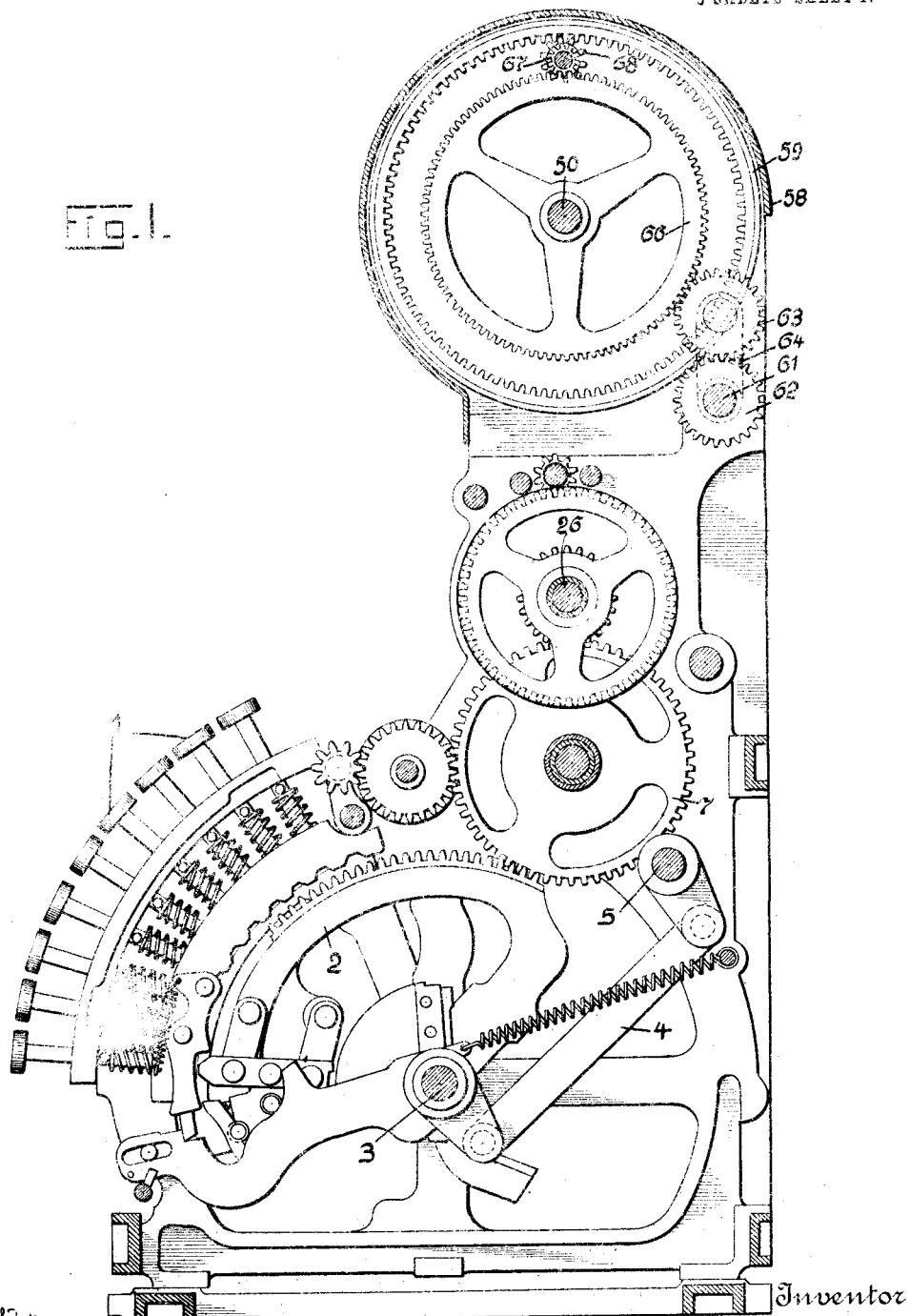

*Sale indicators.*—The mechanism for actuating these indicators is substantially the same as shown and described in the patent granted to Cleal and Reinhard, April 13, 1897 and numbered 580,378, and comprises a plurality of banks of selective or manipulative devices in the form of keys 1, which control the differential movements of segments 2, only one of which is shown, loosely mounted upon a shaft 3, the latter being rocked by a link connection 4 through a rotary shaft 5 which is geared to the operating handle 6. The segment 2 of the penny bank meshes with a gear 7 which in turn engages with a pinion 8 secured to the penny sale indicator 9 through means of a sleeve 10, (see Fig. 3.) The dimes' segment 2 meshes with another gear 7 which engages a pinion 11 secured to the inner end of a sleeve 12 and to which is attached the dimes' indicator 13. The indicators 9 and 13 transfer their movements through gears 14, shafts 15, pinions 16, pinions 16ª to indicators 17 and 18 respectively located at the other end of the machine and arranged to be read from the back of the same, while the indicators 9 and 13 are read from the front. The units of dollars indicator 19 arranged to be read from the back, is attached to one end of a sleeve 20 to which is also secured a pinion 21, which meshes with one of the gears 7 that is driven by the segment 2 controlled by the units of dollars bank of keys 1. The indicator 19 transmits its movement through a gear 22, pinions 23, shaft 24, and a gear 24ª, to an indicator 25 loosely mounted upon a stationary shaft 26, the indicator being arranged to be read from the front of the machine. The segment 2 of the tens of dollars bank meshes with a gear 7 which in turn engages a pinion 27 loosely mounted upon the sleeve 20 near its outer end and has attached thereto a gear 28 which engages a pinion 29 attached to a shaft 30 that also carries, near the center of the machine, a similar pinion 31, which meshes with a gear 32 attached to the side of the front tens of dollars indicator 33. This indicator is attached to the inner end of a sleeve 34 to which is also attached the back indicator 35 for the tens of dollars.

*Change indicators.*—There are two of these indicators and they will be referred to in the description which follows as the cent and dollar change indicators or drums. As previously stated, these indicators which are controlled by the sale indicators are provided with a plurality of circular rows of numerals and each is arranged to be rotated in reversed order from the numerical progression of said groups a number of units corresponding to that displayed by the sale indicators controlling it; that is, for every movement of the penny sale indicator the cent change indicator will be moved one space and every movement of the tens of cents sale indicator will rotate the cent change indicator ten spaces, so that if 55, for example, is displayed by the cent sale indicators, the change indicator will have been rotated fifty-five spaces, thereby bringing into view the complements of any coin or coins above the amount displayed by the sale indicators, up to and including one dollar, that might be tendered in payment. The dollar change indicator is controlled by the units and tens of dollars sale indicators in a similar manner and in addition is given an extra movement upon the movement of the cent change indicator so as to properly indicate the amount of change that is due, if an amount involving cents is to be subtracted from a bill or coin above a dollar.

Fastened to the outer end of the sleeve 10 (see Figs. 3, 9 and 10) is a ten tooth wheel 36, the inner end of said sleeve carrying the penny sale indicator 9. For each unit of movement of said indicator a tooth of the wheel 36 engages the teeth of a pinion 37 and moves the latter one tooth in the direction of the arrow shown in Fig. 2. The pinion 37 is prevented from being accidentally moved by a disk 37ª engaging a locking ring 36ª secured to the wheel 36, which is well known in the art. The pinion 37 is mounted in the outer end of an arm 38 secured to the stationary shaft 26, and as said pinion is rotated by the wheel 36 it will in turn rotate a disk 39 loosely journaled on shaft 26 by engaging teeth formed upon an angular flange portion 40 of said disk (see Fig. 2). These teeth form a gear wheel 41 which meshes with a portion 42 of a double pinion, the other portion 43 of said pinion meshing with a gear 44 formed upon the inner circumference of an angular flange portion 45 of a disk 46 which is loosely mounted upon the sleeve 10. The outer circumference of the angular portion 45 is provided with teeth forming a gear wheel 47, which meshes with a similar wheel 48 secured to the outer end of a sleeve 49 surrounding a shaft 50. The inner end of said sleeve is secured to one of the side walls of the cent change indicator 51 which is divided into one hundred sections. The above described gearing is so proportioned, that for every tenth of a revolution of the penny indicator 9 the change indicator 51 will be revolved in the direction of the arrow, Fig. 2, one hundredth of a revolution.

As previously described the dime indicator 13 is attached to the sleeve 12 to the outer end of which is secured a pinion 52, which meshes with a pinion 53 mounted in the end of a downwardly extending arm 54 secured to the shaft 26. The pinion 53 meshes with a gear wheel 54ª formed internally upon a disk 55 loosely mounted upon the sleeve 12. Attached to this disk 55 is an upwardly extending arm 56, which carries at its outer end the previously described double pinion. The gear wheel 54ª is twice the size of the pinion 52 secured to the sleeve 12, so that as the pinion 52 is rotated in the direction of the arrow, Fig. 2, one tenth of a revolution, the gear wheel 54ª and disk 55 will be rotated in the opposite direction one-twentieth of a revolution, but by means of the portion 42 of the double pinion rotating upon the gear wheel 41, the disk 46 carrying the gears 44 and 47 will be rotated twice as far, or one-tenth of a revolution which will be transferred to the cent change indicator through means of the gear 48 and sleeve 49.

It will, of course, be understood that if the cent and dime indicators 9 and 13 rotate simultaneously, the gearing above described will so multiply the movement of the gear wheel 47 as to produce an extent of movement corresponding to the combined units of movement of said indicators and this movement will be transmitted through the gear wheel 48 and the sleeve 49 to the penny change indicator 51.

Figure 5:
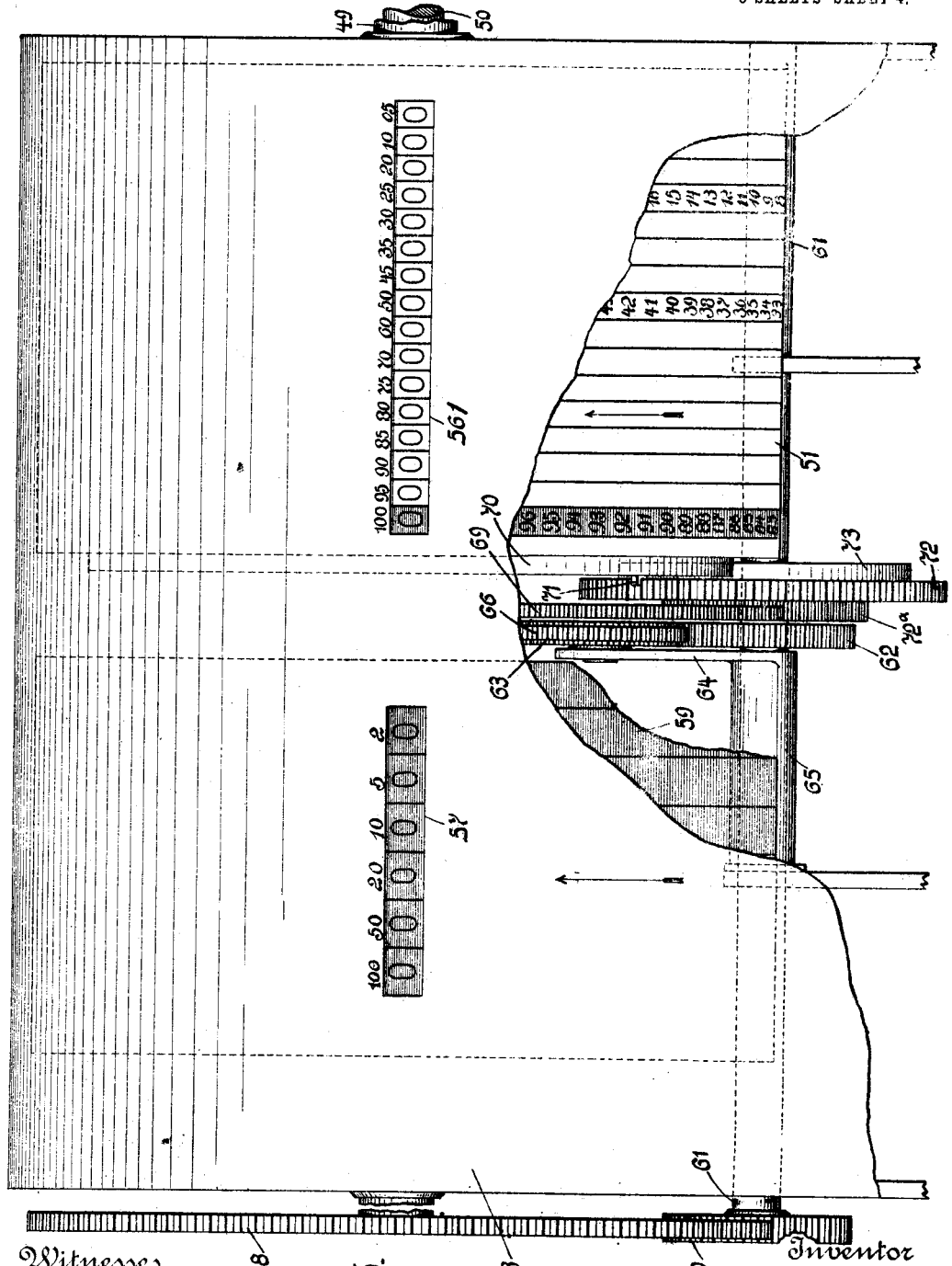

The change indicators as above mentioned are divided into a plurality of circular rows of numerals which are arranged to be exposed through openings 56¹ and 57 formed in a casing 58 surrounding said indicators as the latter are rotated. Stamped upon the casing or placed there in any suitable manner are a plurality of numerals representing the amounts that might be tendered in payment for goods purchased and beneath which the groups of numerals upon the change indicators rotate. Above the opening 561 through which the numerals on the cent change indicator appear are stamped the following figures: 100, 95, 90, 85, 80, 75, 70, 60, 50, 45, 35, 30, 25, 20, 10 and 05, which represent some of the various amounts that might be tendered where the amount purchased is one dollar or less. The group of numerals beneath the figures 100 run from 0 to 99 in reversed order to the direction of rotation of the indicator as shown by the arrow in Fig. 5 and make a complete circle about same; the group beneath the figures 75 consist of numerals from 1 to 24 inclusive in addition to the 0 and are arranged to be displayed during the movement of the indicator from the half to the three-quarters of a revolution, the groups beneath the figures 50, 25, 10 and 05 consist respectively of zeros and numerals 1 to 49, 1 to 24, 1 to 9 and 1 to 4 inclusive and are arranged to be displayed during the first forty-nine, twenty-four, nine and four one-hundredths of a revolution of the indicator 51 respectively. The groups of numerals which appear below the figures 20, 30, 35, 45, 60, 70, 80, 85, 90 and 95 consist of numerals from 1 to 9, inclusive and are arranged to be displayed respectively during the movement of the change indicator from the eleventh to the nineteenth, twenty-first to the twenty-ninth, twenty-sixth to the thirty-fourth, thirty-sixth to the forty-fourth, fifty-first to the fifty-ninth, sixty-first to the sixty-ninth, seventy-first to the seventy-ninth, seventy-sixth to the eighty-fourth, eighty-first to the eighty-ninth and the eighty-sixth to the ninety-fourth hundredths of a revolution of said indicator. All of said numbers are arranged in a reversed order similar to the numerals beneath the figure 100 and each group of numerals have in circular alinement therewith a 0, which when the parts are at home position appears beneath the opening 561, as shown in Fig. 5.

Above the opening 57 through which the numerals on the dollar change drum 59 appear are stamped the following figures: 100, 50, 20, 10, 5, and 2 which represent different amounts in dollars tendered. The groups of numerals of the indicator 59 which appear below the above mentioned figures comprise zeros and numbers from 1 to 99, 1 to 49, 1 to 19, 1 to 9, 1 to 4, and 1 arranged in reverse order similar to the numerals on the cent change drum or indicator and adapted to be displayed during the first ninety-nine, forty-nine, nineteen, four and one one-hundredths of a revolution respectively of the drum 59. Referring now to Fig. 3, it will be seen that the gearing for actuating the dollar change indicator is identical with that for operating the cent change drum, the ten tooth gear wheel 36 being secured to the sleeve 20 which also carries the back indicator 19 for the units of dollars and the pinion 52 secured to the outer end of the sleeve 34 to which is attached the front and back indicators 33 and 35 for the tens of dollars. The large gear wheel 48 driven by the dollar sale indicators is not connected directly to the dollar change indicator 59 by the sleeve 49 as is the case with the cent indicator 51, but is arranged to drive said indicator by the following described gearing: Meshing with the gear 48 driven by the dollar sale indicators is a pinion 60 secured to one end of a transverse shaft 61, which has also attached to it, near its center, a similar pinion 62 that meshes with an idler 63 (see Figs. 1, 3 and 5), which is mounted in the upper end of an arm 64 that projects from one end of a sleeve 65 surrounding the shaft 61, the other end of said sleeve being secured rigidly to the frame of the machine. The pinion 63 meshes with a gear wheel 66 loosely mounted upon the shaft 50 and which meshes with a portion 67 of a double pinion, the other portion 68 of which engages teeth formed upon the inner circumference of one of the side walls of the dollar change drum 59. This gearing is so proportioned that the movement of one tooth of the wheel 48 will revolve the dollar indicator drum 59 an equal distance. The above described double pinion is mounted upon a gear wheel 69 near its periphery, the said gear wheel being loosely mounted upon the shaft 50 between the gear wheel 66 and a disk 70 attached to the inner end of the cent change drum 51. This disk 70 is provided with a laterally projecting tooth 71 (see Figs. 1, 5, 7 and 8), which, when the drum 51 is at zero, engages with teeth of a gear 72, the latter having attached thereto a gear 72$^a$ half its size but having the same number of teeth which mesh with the teeth of wheel 69. Secured to the opposite side of gear 72 or forming a part thereof and in vertical alinement with the disk 70 is a locking disk 73 provided with a concave portion 74 which is arranged to engage the periphery of the disk 70 after the first movement of the latter and thereby become locked; the disk 70 having a concave portion 74$^a$ to permit the movement of the disk 73.

It will be seen from the above description that, when the cent drum 51 starts to revolve, it will rotate the gear 72 one tooth, the latter in turn rotating the gear wheel 69 one tooth through means of the gear 72$^a$. The wheel 69 is provided with two hundred teeth, so that rotating it one tooth will revolve it one two-hundredth of a revolution, which movement through the planetary form of gearing 66, 67 and 68 will rotate the dollar drum one-hundredth of a revolution. When the cent and dollar drums are simultaneously operated by their sale indicators, the gears 66 and 69 driven by the dollar and cent drum respectively will move in opposite directions whereby the dollar drum 59, through the above described planetary gearing, will be moved an additional one-hundredth of a revolution to that imparted to it by its sale indicators, so as to properly indicate the change due.

Having now described the invention in detail a résumé of its operation will be given.

Assuming that all of the parts are at zero and $5. has been tendered in payment for a purchase amounting to $2.75, the clerk depresses the $2., .70 and .05 cent keys and turns the crank 6, during the movement of which the segments 2 corresponding to the banks in which keys are depressed will be connected to the rock-shaft 3 and move therewith until disconnected by the depressed keys. Each movement of the segments 2 will be transmitted to their respective indicators through gears 7; and through suitable shafts and pinions the back and front indicators of each denomination will move synchronously, all of which is well known in the art and fully described and shown in the patent to Cleal and Reinhard heretofore mentioned. The cents indicator 9 (see Fig. 3), will be given five-tenths of a revolution, and through the sleeve 10 rotate the ten tooth wheel 36 a corresponding distance, which in turn will rotate the pinion 37 mounted in the outer end of the arm 38, five teeth, the latter engaging with the gear wheel 41 formed upon the circumference of the angular rim 40 of the disk 39. The gear wheel 41 meshes with the portion 42 of the double pinion, the other portion 43 of which meshes with the gear wheel 44 formed upon the inner circumference of the disk 46, upon the outer circumference of which is formed the gear wheel 47 which meshes with a similar wheel 48 connected to the cent change indicator. The dimes indicator 13 is arranged to be given seven-tenths of a revolution by its segment and through means of the sleeve 12 (see Fig. 3), revolves a pinion 52 connected thereto a similar distance. If the dimes indicator is rotated by itself, the pinion 52 will be revolved in the direction of the arrow thereon (see Fig. 2), and through the pinion 53 carried by the arm 54 and internal gear wheel 54ª rotate the disk 55 and the arm 56 attached thereto in the direction of arrow A; the gear wheel 54ª being twice the size of pinion 52 will be rotated only half the distance or seven-twentieths of a revolution, but by the planetary gearing 41, 42 and 43 the disk 46 carrying the gears 44 and 47 will be rotated twice as far or seven-tenths of a revolution.

When the cent and dime indicators are operated simultaneously, as they would be to the extent of a half revolution in the example given above, the disk 39 will be revolved in the direction of the arrow B (Fig. 2) by the pinion 37, while the double pinion is rotating in the opposite direction and consequently imparting to said double pinion through the gear 41 formed upon the disk 39 any movement of said disk in addition to the movement imparted to said pinion by the portion 42 riding over the teeth 41. These movements of the double pinion will be transmitted through gears 44 and 47 of the disk 46 and the gear 48 and sleeve 49 to the cent change drum 51. The gearing between the sale indicators 9 and 13 and the change drum 51 is so proportioned that every tenth of a revolution of the cents indicator will revolve the cents change drum one-hundredth of a revolution, while every tenth of a revolution of the dimes indicator will revolve the cents change drum one-tenth of a revolution and the simultaneous operation of the sale indicators 9 and 13 will revolve the change drum 51 a number of units corresponding to that displayed by the sale indicators.

In the particular example chosen the tens of dollars indicator remains at zero position but the units of dollars indicator is moved two spaces and thereby through the gearing shown at the left of Fig. 4, and which is precisely similar to the gearing at the right of this figure, transmits a two space movement to pinion 60, shaft 61 and pinion 62. The operation of the cents and dimes mechanism causes pin 71 to operate its connected gears and to move double pinion 67, 68 one space, this movement causing an additional movement of the dollar drum, so that as a result of the direct movement of the dollar drum due to the dollar indicator and the transfer movement of said drum, due to the cents drum, said dollar drum is moved three spaces thereby indicating two dollars as the correct change from the five dollars tendered. The movement of the cents drum through seventy-five spaces will cause it to present the numeral 25 at the reading line indicating the fractional change due.

The operation, when amounts requiring the movement of the tens of dollars indicator are employed, will be obvious from the foregoing and need not be further elaborated.

It is to be understood that if a fraction of a dollar is to be taken out of any coin or bill over a dollar, it is always necessary to read the amount displayed upon the cent drum 51 below the figure 100 upon the casing, as well as the amount exhibited below the figure upon the dollar section representing the amount tendered, in order to find out the correct amount of change.

As will be seen in Fig. 5 the numerals of the cent drum 51 which appear beneath the figure 100 are of the same color as the numerals upon the dollar drum 55, so as to aid in quickly locating the fractions of a dollar that are to be returned in change.

A fact recognized by all merchants is, that, one of their greatest sources of loss is mistakes in change. Such mistakes would be reduced to a minimum with a machine of the class above described in use.

While the form of device here shown and described is admirably adapted to fulfil the objects primarily stated, it is to be understood that it is not desired to confine the invention to one form of embodiment here disclosed, for it is susceptible of embodiment in various forms, all coming within the scope of claims which follow.

What is claimed is:

1. In a cash register, the combination with a series of elements for selecting the amounts in different denominations, of a single change indicating device, and means for adjusting said device according to the combined movements of the different denominational elements.

2. In an accounting machine, the combination with a bank of "tens" keys and a bank of "units" keys, of a casing having an opening, a cylinder having indicia thereon and pivoted to rotate adjacent said opening, differential mechanisms separately movable under control of said banks of keys, and connections from both said differential mechanisms to said cylinder, said connections having differing gear ratios.

3. In an accounting machine, the combination with a bank of "tens" keys and a bank of "units" keys, of a casing having an opening, a cylinder having indicia thereon and pivoted to rotate adjacent said opening, differential mechanisms separately movable under control of said banks of keys, a gear connected to said cylinder, connections from the differential mechanism controlled by said "tens" keys to move said gear to extents varying by ten units, and connections from the differential mechanism controlled by said units keys to move said gear to extents varying by one unit.

4. In a cash register, the combination with a plurality of sale indicators, of a single change indicator, means for controlling the movements of the sale indicators, and means for moving the change indicator a number of units corresponding to the number displayed by the sale indicators.

5. In a cash indicating machine, the combination with a plurality of sale indicators, of a single change indicator, manipulative devices for controlling the amount displayed by the sale indicators, and means for moving the change indicator a number of units corresponding to the amount displayed by the sale indicators.

6. In a cash indicating machine, the combination with a plurality of sale indicators, of a single change indicator, means for controlling the amount displayed by the sale indicators, and means for moving the change indicator by the sales indicators a number of units corresponding to the amount displayed by the sale indicators.

7. In a cash indicating machine, the combination with a plurality of sale indicators, of a single change indicator, means for controlling the amount displayed by the sale indicators, and a planetary gearing common to the controlling means for moving the change indicator a number of units corresponding to the amount displayed by the sale indicators.

8. In a cash indicating machine, the combination with a plurality of sale indicators, of a change indicator, means for controlling the amount displayed by the sale indicators, and planetary gearing actuated by the sale indicators for operating the change indicator a number of units corresponding to the amount displayed by the sale indicators.

9. In a cash indicating machine, the combination with a plurality of sale indicators, of a change indicator, a casing for the latter provided with a reading opening, means for controlling the movements of the sale indicators, and means controlled by the sale indicators for moving the change indicator so as to bring to the reading opening different amounts each of which is complementary to the amount displayed by the sale indicators and different amounts which might be tendered in payment.

10. In a cash indicating machine, the combination with a sale indicator, of a change indicator comprising a plurality of groups of numerals representing the complements of the amount on the sale indicator and certain amounts which might have been tendered in payment, and a common means for operating said indicators.

11. In a cash indicating machine, the combination with a sale indicator, of a change indicator comprising a plurality of groups of numerals, a series of keys for controlling the movements of said indicators, and a scale adjacent said numerals bearing characters representing various amounts tendered.

12. In an accounting machine, the combination with a bank of "tens" keys and a bank of "units" keys, of differential mechanisms separately movable under control of said banks of keys, a casing having an opening, a cylinder having indicia thereon and pivoted to rotate adjacent said casing opening, and planetary gearing connecting both said differential mechanisms to said cylinder, and constructed to drive said cylinder from the tens keys faster than from the units keys in the ratio of ten to one.

13. In an accounting machine, the combination with two banks of keys, and mechanisms separately differentially movable under control of said banks, of a casing having an opening, a cylinder having indicia thereon and pivoted to rotate adjacent said opening, and gear connections from both said differentially movable mechanisms to said cylinder, constructed to rotate said cylinder in both directions, and to have differing gear ratios.

14. In an accounting machine, the combination with two banks of keys, and mechanisms separately differentially movable under control of said banks, of a cylinder having indicia thereon and pivoted to permit rotation thereof, and driving connections from both said differentially movable mechanisms to said cylinder, constructed to cause cumulative rotation of said cylinder by simultaneous action of said mechanisms, said connections having differing ratios of gearing to the cylinder.

In testimony whereof I affix my signature in the presence of two witnesses.

WILLIAM H. MUZZY.

Witnesses:
R. W. FAIRCHILD,
W. M. McCARTHY.